United States Patent
Akazawa et al.

(10) Patent No.: US 7,155,680 B2
(45) Date of Patent: Dec. 26, 2006

(54) APPARATUS AND METHOD FOR PROVIDING VIRTUAL WORLD CUSTOMIZED FOR USER

(75) Inventors: Yoshiko Akazawa, Kawasaki (JP); Osamu Iemoto, c/o Fujitsu Limited, 1-1, Kamikodanaka 4-chome, Nakahara-ku, Kawasaki-shi, Kanagawa, 211-8588 (JP)

(73) Assignees: Fujitsu Limited, Kawasaki (JP); Osamu Iemoto, Osaka (JP)

( * ) Notice: Subject to any disclaimer, the term of this patent is extended or adjusted under 35 U.S.C. 154(b) by 442 days.

(21) Appl. No.: 09/840,151

(22) Filed: Apr. 24, 2001

(65) Prior Publication Data

US 2002/0113809 A1   Aug. 22, 2002

(30) Foreign Application Priority Data

Dec. 27, 2000 (JP) ............................ 2000-398405

(51) Int. Cl.
*G06F 3/00* (2006.01)
*G06F 9/00* (2006.01)
*G06F 17/00* (2006.01)

(52) U.S. Cl. .................... 715/757; 715/706; 715/745

(58) Field of Classification Search ............... 345/706, 345/745, 761, 757, 744, 848–852; 705/26
See application file for complete search history.

(56) References Cited

U.S. PATENT DOCUMENTS

| | | | | |
|---|---|---|---|---|
| 5,884,029 A | * | 3/1999 | Brush et al. ................ 709/202 |
| 6,014,638 A | * | 1/2000 | Burge et al. ................ 705/27 |
| 6,366,285 B1 | * | 4/2002 | Brush et al. ................ 345/473 |
| 6,381,583 B1 | * | 4/2002 | Kenney ....................... 705/26 |
| 6,396,509 B1 | * | 5/2002 | Cheng ......................... 715/706 |
| 6,572,662 B1 | * | 6/2003 | Manohar et al. ............ 715/526 |

* cited by examiner

Primary Examiner—Kristine Kincaid
Assistant Examiner—Boris Pesin
(74) Attorney, Agent, or Firm—Staas & Halsey LLP

(57) ABSTRACT

The invention relates to generating a variable virtual world in accordance with user's potential needs. An information processing apparatus includes a processor. The processor causes an image of a first virtual world to be displayed on a display. The first virtual world includes predefined objects and an avatar selected by the user. The avatar is controlled to act in the first virtual world by the user. The processor analyzes the action of the avatar from the position of the avatar relative to the position of the object in the first virtual world to derive a feature of the user and determine a second virtual world including other objects in accordance with the derived feature. The processor causes an image of the second virtual world to be displayed on the display.

26 Claims, 11 Drawing Sheets

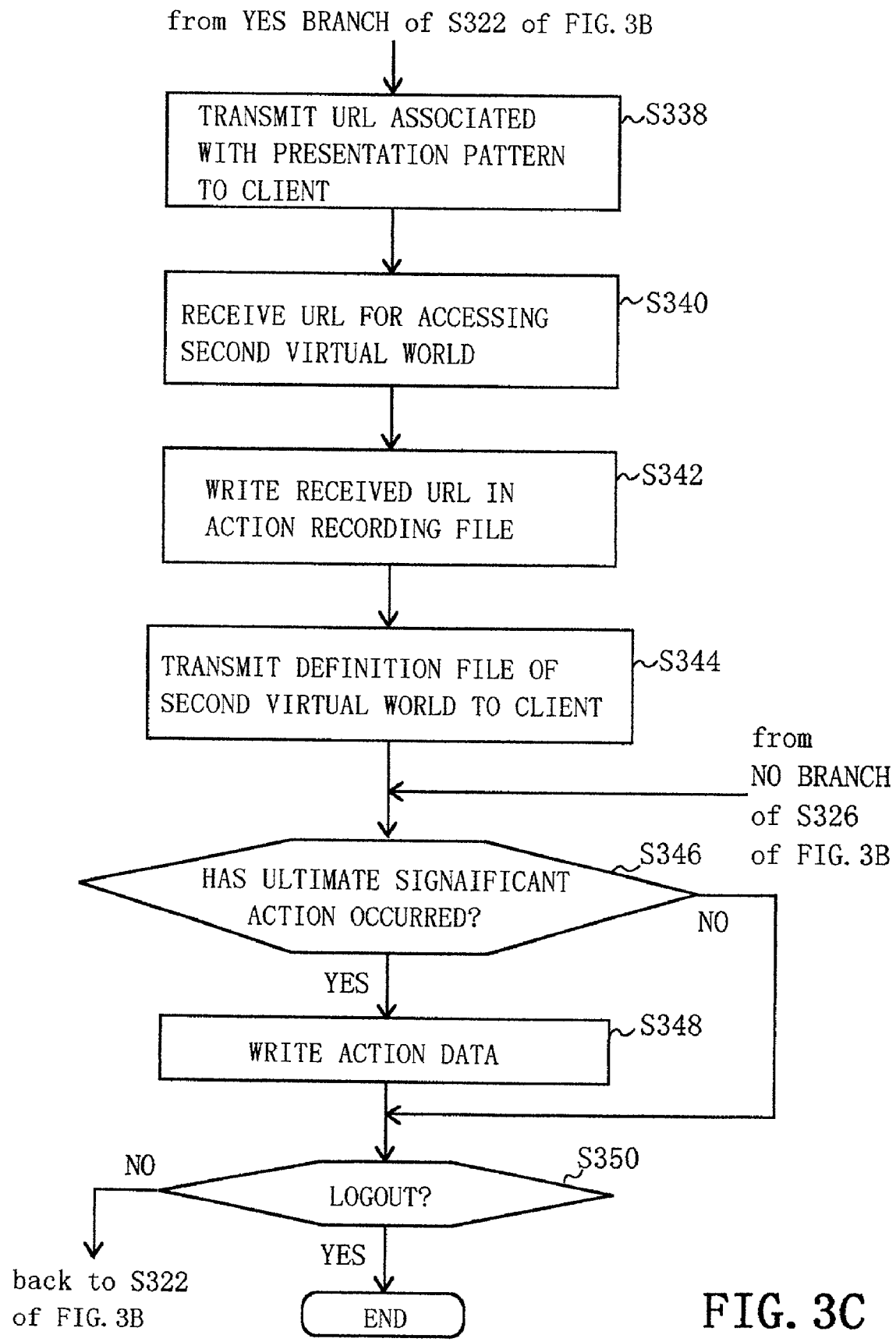

```
                                            ┌─500
       QUESTIONNAIRE 1   (Click Pertinent Box ☐.)
   Question 1  How old are you?
   ☐ 20 or younger, ☐ 21 to 30, ☐ 31 to 40, ☐ 41 to 50,
   ☐ 51 or older
   Question 2  What is your distinction of sex?
   ☐ male,  ☐ female
   Question 3  What is your annual income?
   ☐ $3 million or less,
   ☐ $3 million to $5 million
   ☐ $5 million to $10 million,
   ☐ $10 million to $20 million,
   ☐ $20 million or more
   Question 4  What is your family make-up?
   ☐ single,
   ☐ married (number of children ☐one, ☐two,
                                 ☐three, ☐four or more)
   Question 5  What is your residence form?
   ☐ living alone,
   ☐ living with family,
   ☐ living temporarily apart from family
   Question 6  How much are your personal expenses per
               month?
   ☐ $100 or less, ☐ $101 to $500 ,
   ☐ $501 to $1000, ☐ $1001 to $2000,
   ☐ $2,001 or more
   Question 7  What is your preference?
   ☐ famous brand, ☐ high quality, ☐ cost performance
   ☐...
   Question 8
   ...
```

FIG. 4

```
    QUESTIONNAIRE 2  (Click Pertinent Box ☐.)
Question 1  What is your purpose of purchase
this time?
☐ home or personal use, ☐ present
Question 2  How much is your budget?
☐ $100 or less, ☐ $101 to $500,
☐ $501 to $1000 ☐ $1,001 to $2,000
☐ $2,001 or more
Question 3
...
```

FIG. 5

APPARATUS AND METHOD FOR PROVIDING VIRTUAL WORLD CUSTOMIZED FOR USER

FIELD OF THE INVENTION

The present invention relates to generating a variable virtual world on an individual user basis.

BACKGROUND OF THE INVENTION

Currently, in home pages of the Internet, shopping malls are provided in a two-dimensional virtual world of a fixed configuration, in which wares are displayed in fixed arrangement. The shopping malls may be provided in a three-dimensional virtual world.

In such a configuration of shopping malls, however, a customer or user of the shopping mall system may not able to find a desired commodity on a current display screen of a client machine, even if such a desired commodity is provided within or near a picture on that screen. There is also a known way of finding a desired commodity by performing keyword search on the display screen. Such a desired commodity, however, may not be found, unless the user enters an appropriate keyword. These inconveniences for the user are also disadvantageous to proprietors and managers of the shopping malls.

It is an object of the present invention to provide a variable virtual world in accordance with user's potential needs.

SUMMARY OF THE INVENTION

In accordance with one aspect of the present invention, an information processing apparatus includes a memory device and a processor. The memory device has a first memory area for storing data inputted by the user and a second memory area for storing sets of data representative of a plurality of respective virtual worlds. The processor causes an image of a first virtual world to be displayed on a display. A set of data representative of the first virtual world is stored in the second memory area. The first virtual world includes a predefined object and an avatar selected by the user. The object is associated with a specific content. The avatar is controlled to act in the first virtual world by the user. The processor stores, in the first memory area, a position of the avatar in the first virtual world that is inputted by the user. The processor analyzes the action of the avatar in the first virtual world to derive a feature of the user and determine a second virtual world including another object in accordance with the derived feature. The other object has a specific content and a specific position. The processor allows an image of the second virtual world to be presented on the display.

In accordance with another aspect of the invention, an information processing apparatus includes a processor, which provides a set of definition data of a first virtual world stored in a second memory area to an information processing terminal of a user. A first virtual world includes a predefined object and an avatar selected by the user. The object is associated with a specific content. The avatar is controlled to act in the first virtual world by the user. The processor stores, in a first memory area, a position of the avatar in the first virtual world that is inputted by the user. The processor analyzes the action of the avatar in the first virtual world to derive an interest of the user and determine a second virtual world including another object in accordance with the derived interest. The other object has a specific content and a specific position. The processor provides data associated with the second virtual world to the user information processing terminal.

In accordance with a further aspect of the invention, a program stored in a recording medium enables a processor of an information processing apparatus to perform the step of causing an image of a first virtual world to be displayed on a display. A set of data representative of the first virtual world is stored in a second memory area. The first virtual world includes a predefined object and an avatar selected by the user. The object is associated with a specific content. The avatar is controlled to act in the first virtual world by the user. The program further enables the processor to perform the steps of storing, in a first memory area, a position of the avatar in the first virtual world that is inputted by the user, and analyzing the action of the avatar in the first virtual world to derive a feature of the user and determine a second virtual world including another object in accordance with the derived feature. The other object has a specific content and a specific position. The program further enables the processor to perform the step of allowing an image of the second virtual world to be displayed on the display.

In accordance with a still further aspect of the invention, a program stored in a recording medium enables a processor of an information processing apparatus to perform the step of providing a set of definition data of a first virtual world stored in a second memory area to an information processing terminal of a user. The first virtual world includes a predefined object and an avatar selected by the user. The object is associated with a specific content. The avatar is controlled to act in the first virtual world by the user. The program further enables the processor to perform the steps of storing, in a first memory area, a position of the avatar in the first virtual world that is inputted by the user, and analyzing the action of the avatar in the first virtual world to derive an interest of the user and determine a second virtual world including another object in accordance with the derived interest. The other object has a specific content and a specific position. The program further enables the processor to perform the step of providing data associated with the second virtual world to the user information processing terminal.

In accordance with a still further aspect of the invention, a method for generating a variable virtual world comprises the steps of storing data inputted by a user in a memory device, analyzing the inputted data stored in the memory device to derive a feature, determining a virtual world in accordance with the derived feature, and presenting data associated with the determined virtual world to a device of the user.

According to the invention, a variable virtual world can be generated in accordance with user's potential needs.

BRIEF DESCRIPTION OF THE DRAWINGS

FIG. 3C is a third portion of the flowchart of the server function that is performed by the server processor;

FIG. 4 illustrates a first questionnaire for a user to obtain first basic user data;

FIG. 5 illustrates a second questionnaire for the user to obtain second basic user data;

DETAILED DESCRIPTION OF THE PREFERRED EMBODIMENTS

Figure 1:
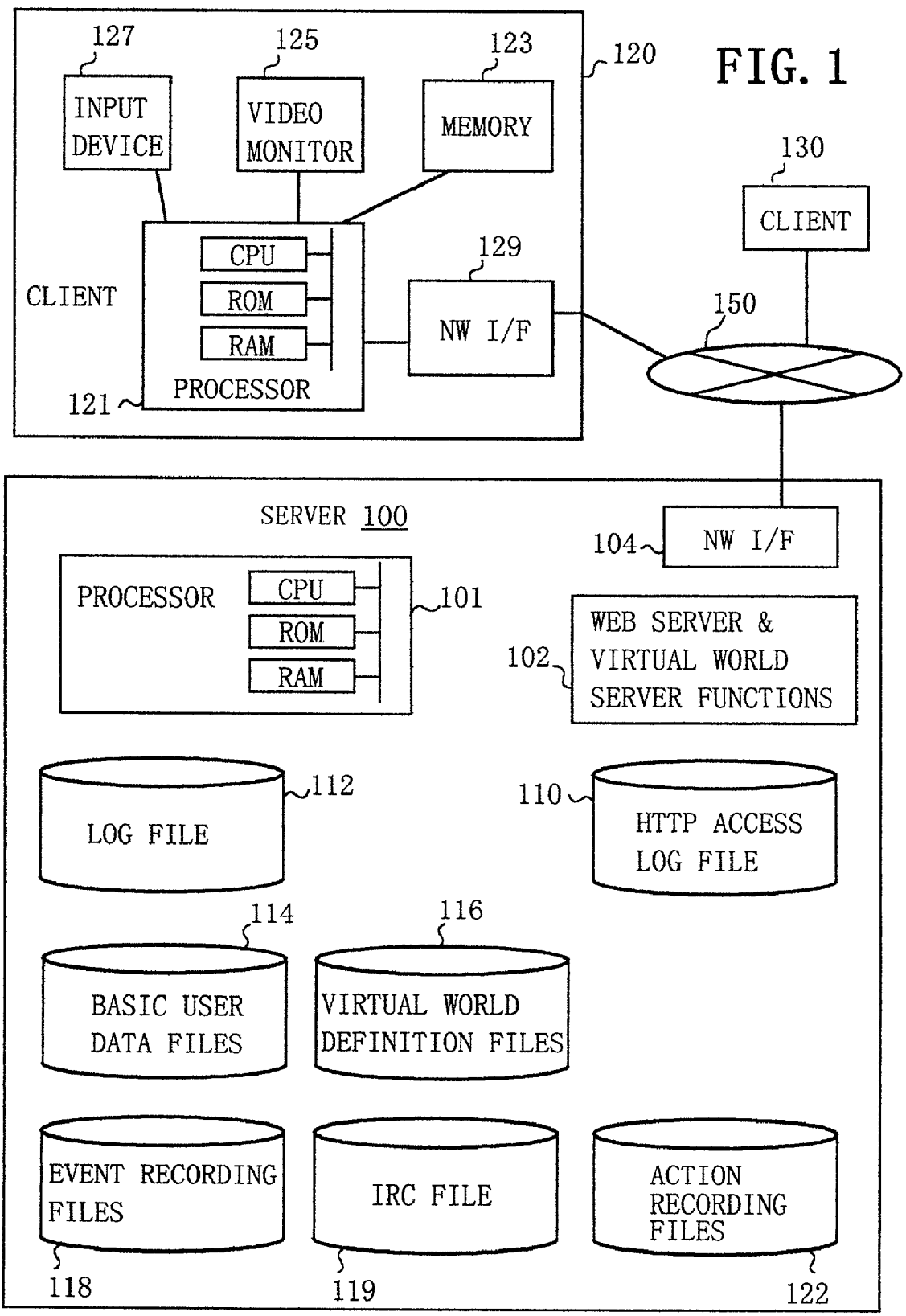
FIG. 1 is a block diagram showing a system configuration composed of a server machine and client machines that are interconnected via a network, in accordance with an embodiment of the present invention.

FIG. 1 shows a configuration of a system having a server machine 100 and client machines 120 and 130, which are interconnected via a network such as the Internet, a telephone network or a local area network (LAN) in accordance with an embodiment of the invention. The server machine 100 has a Web server function and a virtual world server function. In this embodiment, a virtual world is described as a virtual shop or a virtual shopping mall in a virtual three-dimensional space, but may be any other kind of virtual world, such as a virtual school, a virtual university, a virtual college, and a virtual museum. Alternatively, the virtual world may be described in a virtual two-dimensional space.

Referring to FIG. 1, the system configuration of the server machine 100 is described. The server machine 100 (hereinafter simply referred to as a server) typically has a processor 101, memory devices 102 to 122 such as magnetic disks, a network interface 104, a video monitor (not shown), a keyboard (not shown) and the like. The processor 101 typically includes a CPU, a ROM and a RAM. The server further has a plurality of server functions that are implemented in the form of application programs stored in the memory device 102, and has a HyperText Transfer Protocol (HTTP) access log file 110, a log file 112, basic user data files 114, virtual world definition files 116, event recording files 118, an Internet Relay Chat (IRC) file 119 and action recording files 122. The plurality of server functions include the Web server function and the virtual world server function which are implemented by the processor 101.

The client machine 120 (hereinafter simply referred to as a client) may be an information processing apparatus such as a personal computer (PC) of a desktop type, a notebook type or a handheld type, and includes a processor 121, a memory device 123, a video monitor or a display device 125, an input device 127 such as a keyboard and a mouse, and a network interface 129 which may include a dialer and a modem. The memory device 123 of the client 120 stores a Web browser program and a virtual world client function program which are performed by the processor 121. The virtual world client function program and the virtual world server function program provide an extended VRML server/client system in accordance with the invention.

Figure 2:
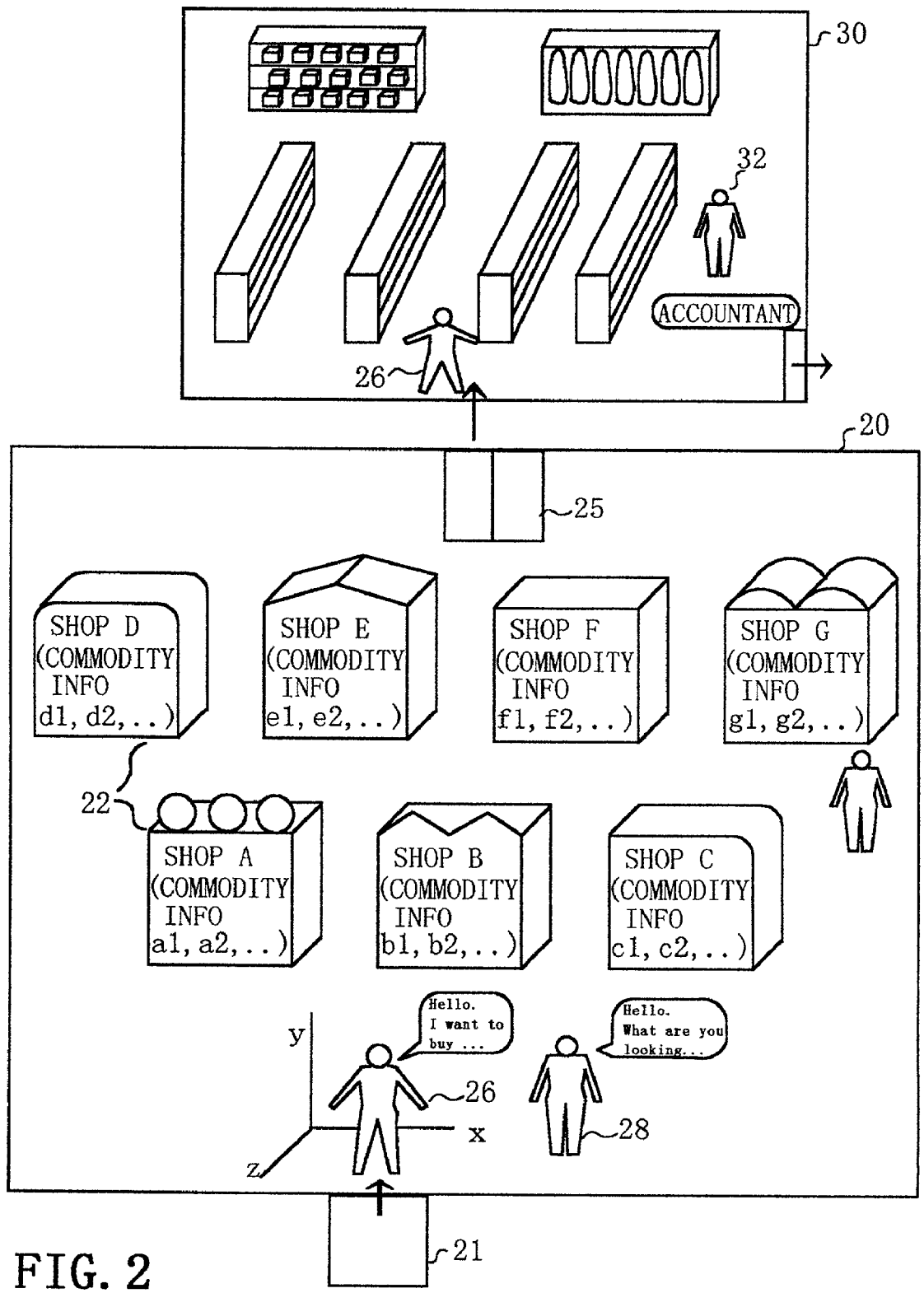
FIG. 2 shows a first predefined three-dimensional virtual world and a second variably defined three-dimensional virtual world in accordance with an embodiment of the present invention.

FIG. 2 shows a first predefined three-dimensional virtual world 20 and a second variably or adaptively defined three-dimensional virtual world 30 in accordance with the embodiment of the invention. The virtual worlds 20 and 30 in this embodiment are described in the Virtual Reality Modeling Language(VRML) in a well-known manner. The first virtual world 20 represents a virtual reception room, in which a plurality of information displaying objects or bodies 22, a door 25 to the second virtual world 30, and the like are arranged. The second virtual world 30 represents a virtual shop, within which a plurality of wares are arranged in a commodity presentation pattern that is determined in a process as described later in detail.

In the virtual worlds 20 and 30, the arrangement or positions of different objects, such as buildings, information displaying objects 22, signs, doors, shelves, wares and walls are predefined in a known form by respective sets of Cartesian, directional orientation and angular coordinates (x, y, z, ox, oy, oz, rd) in the three-dimensional space.

An avatar 26 of the user appears in the virtual worlds 20 and 30. The user controls the avatar 26 to act in the virtual worlds 20 and 30, using the input device 127 such as a keyboard and/or a mouse.

A position, i.e. a location and a posture, and behavior of the avatar 26 in the virtual worlds 20 and 30 at each time can be also described similarly in a known form by a set of Cartesian, directional orientation and angular coordinates (x, y, z, ox, oy, oz, rd). A subset (x, y, z) of the set of coordinates represents Cartesian coordinates of a location of the avatar 26 in the three-dimensional space. A subset (ox, oy, oz, rd) represents orientation and angular coordinates of the avatar 26 relative to the subset of Cartesian coordinates (x, y, z). A subset (ox, oy, oz) represents an orientation vector that indicates directional orientation of the body of the avatar 26. A subset or coordinate (rd) represents directional orientation or an angle (radian) of the avatar's front, i.e. face, around the orientation vector as an axis. The set of Cartesian, orientation and angular coordinates of the avatar 26 is transmitted from the client 120 to the server 100 as the spatial coordinate data of the avatar 26 at fixed time intervals (e.g., at a period of one second as a default value), and is stored in the log file 112 and analyzed by the server 100.

The server 100 compares the set of coordinates of the avatar 26 in the log file 112 with the sets of coordinates of respective objects in the virtual world definition file 116 to determine a difference between the set of coordinates of the avatar 26 and the sets of coordinates of the objects. Thereby, the server 100 determines whether the avatar 26 has passed through the door, whether the avatar 26 has approached any one of the information displaying objects 22, and whether the avatar 26 has produced other significant actions. Also, the server 100 determines whether the avatar 26 or the user has seen detailed information associated with any one of the information displaying objects 22 in the virtual reception room 20, in accordance with the Cartesian and other coordinates of the objects 22, an occurrence of a mouse click, and a clicked Uniform Resource Locator (URL) for accessing the detailed information. The activated URL can be identified by looking into the HTTP access log file 110.

Figure 3A:
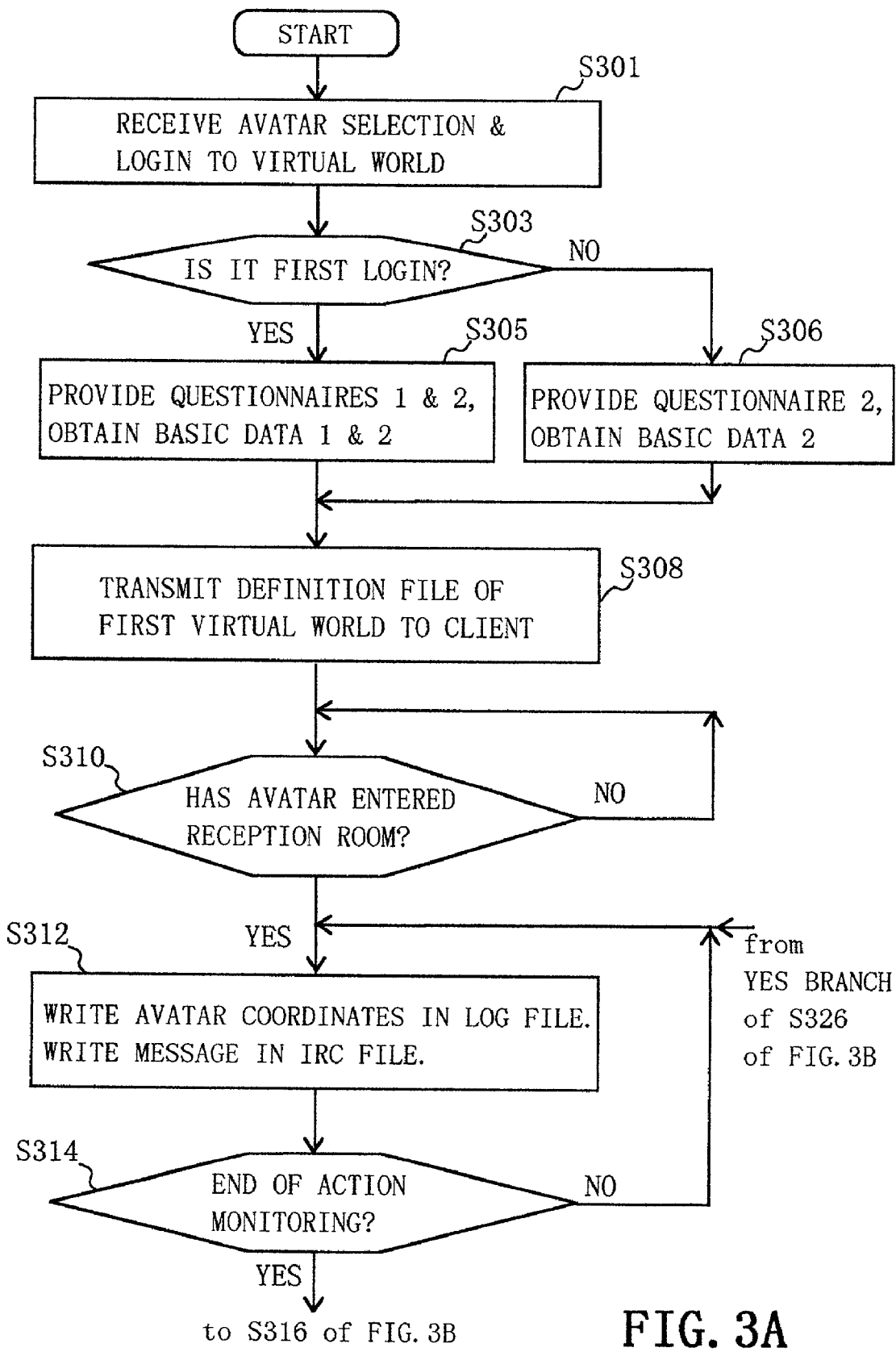
FIG. 3A is a first portion of a flowchart of a server function that is performed by a server processor.
Figure 3B:
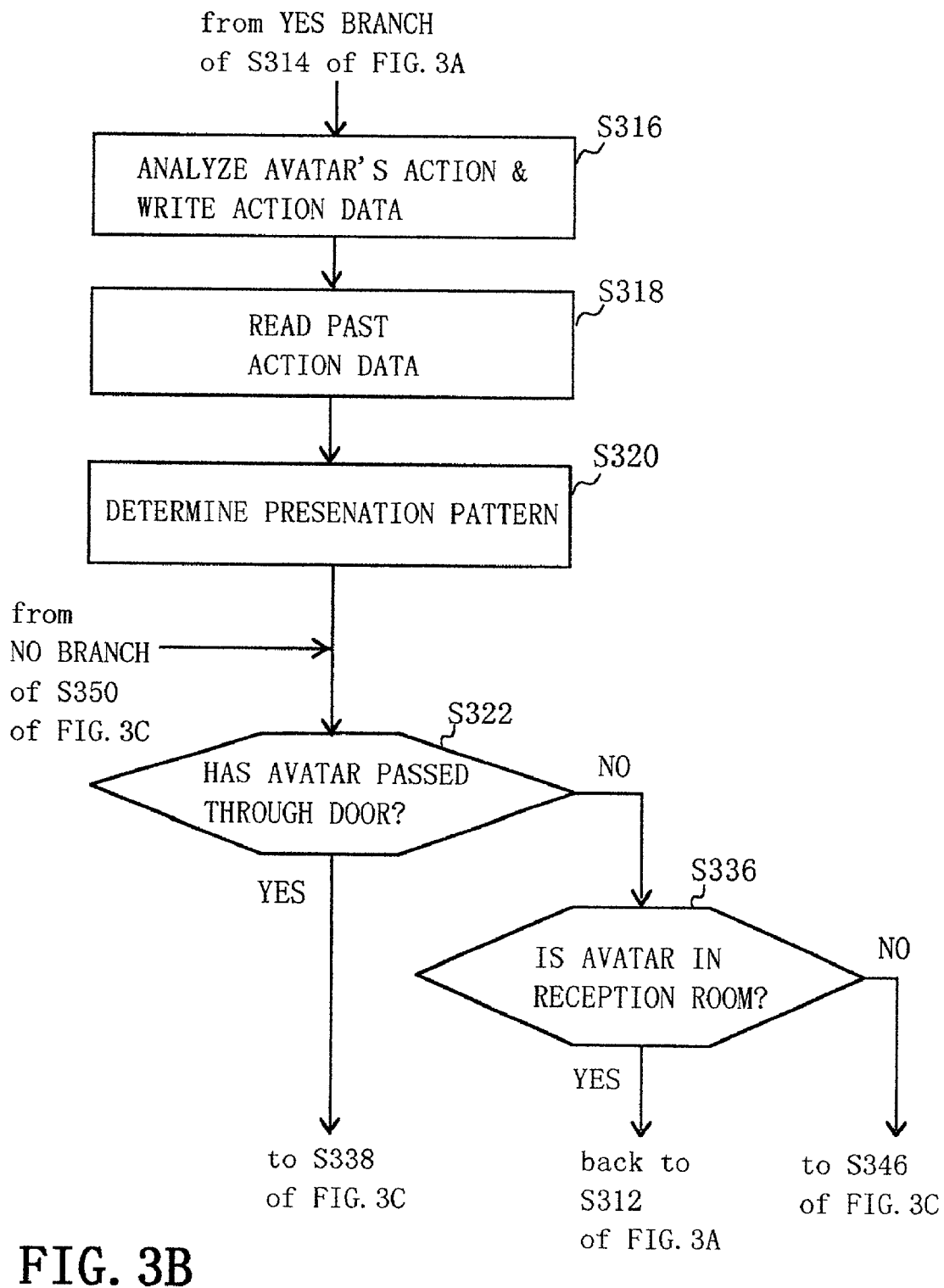
FIG. 3B is a second portion of the flowchart of the server function that is performed by the server processor.

FIGS. 3A through 3C show a flowchart for the Web server function and the virtual world server function that is performed by the server 100 in accordance with the invention. The Web server function and the virtual world server function operate in response to the received user's input data from the client 120. The input data includes data representing the action of the avatar 26. The virtual world server function includes an Internet Relay Chat (IRC) function.

The user operates the Web browser on the client 120 to access a virtual shop system of the server 100. In this case, the user or the avatar 26 is a customer of the shop. At Step 301 in FIG. 3A, the server 100 transmits data of an initial display screen (not shown) for the virtual shop to the client 120 to cause the screen to be displayed on a video monitor 125. The screen prompts the user to select one of avatars and log in to the virtual shop server 100.

When the user has logged in, the server 100 at Step 303 determines whether the user has logged in for the first time by checking a received user ID from the client 120, while looking into the log file 112 or the basic user data files 114. The server 100 then transmits one or more questionnaires for obtaining the basic user data as described below, and causes the client 120 to display a screen, which includes the one or more questionnaires on the video monitor 125 and instructs the user to answer them.

FIG. 4 illustrates a first questionnaire for obtaining the first basic user data from the user. FIG. 5 illustrates a second questionnaire for obtaining the second basic user data from the user. At Step 303, if it is determined that the user has logged in to the server 100 for the first time, the server 100 first presents a display screen, designated as 500, including Questionnaire 1 for the user in FIG. 4. From user's answers to Questionnaire 1, the server 100 obtains the first basic user data, such as age, distinction of sex, annual income, family make-up, residence form, personal expenses per month, and preference in purchasing, and stores the data in the basic user data file 114 for the user in FIG. 1. Then, the server 100 presents another display screen, designated as 600, including Questionnaire 2 for the user in FIG. 5. From user's answers to Questionnaire 2, the server 100 obtains the second basic user data, such as the purpose of purchase and the budget at this time, and stores the data in the basic user data file 114.

Unless it is determined at Step 303 that the user has logged in for the first time, in other words, if the user has logged in for the second time or beyond, then the server 100, at Step 306, presents only the screen 600 of Questionnaire 2 of FIG. 5. Thus the server 100 obtains the second basic user data, such as the purpose of purchase and the budget at this time, and stores the data in the basic user data file 114.

Then, at Step 308, the server 100 transmits, to the client 120, data of the definition file 116 of the virtual three-dimensional reception room 20 for the virtual shop. The reception room 20 includes an entrance 21 to the reception room 20 and the selected avatar 26. The client 120 receives the data of the definition file 116, and then displays, on the video monitor 125, a display screen of the entrance 21 and the avatar 26 in front of the entrance 21.

The user is allowed to control the avatar 26 to act in the virtual reception room 20. Since the coordinate data representing the action of the avatar 26 is transmitted from the client 120 to the server 100 at fixed time intervals, the server 100 at Step 310 at fixed intervals determines whether or not the avatar 26 has entered the virtual reception room 20 of FIG. 2. If it is determined that the avatar 26 has not entered the reception room 20 yet, Step 310 is iteratively performed until the avatar 26 enters the reception room 20.

In the reception room 20 as shown in FIG. 2, the plurality of three-dimensional information displaying objects 22 of different designs are arranged. The objects 22 indicate, on their walls, respective shop names A to G, and respective sets of pieces of information on commodities (a1, a2, . . . ), . . . , and (g1, g2, . . . ) associated with the respective shop names A to G. Each information displaying object 22 has a form of a small building or a booth, and may have an inside room for displaying different pieces of information on the commodities.

The pieces of information include commodity information, such as outlines of the commodities, detailed information on the commodities, recommended commodities and the bargain sale information. The commodity information also provides a URL which facilitates to access the detailed information described in the Hyper Text Markup Language (HTML), and the user can see the detailed information by clicking the URL indication on the screen. An event of clicking the URL indication, i.e. accessing the detailed information associated with the URL, is recorded on the HTTP access log file 110. The detailed information may include a still picture, a motion picture, music, voice and the like.

If it is determined at Step 310 that the avatar 26 enters the reception room 20, then the server 100 at Step 312 writes the coordinate data representing the action of the avatar 26 in the reception room 20 into the server log file 112 at fixed intervals, for example, at a period of 10 milli-seconds to 30 seconds, during a current period of time for monitoring the action. The log file 112 stores the log data, which includes the date, time of the day, a name of a virtual world, user ID, an name of an avatar, client ID, and a set of avatar coordinates (x, y, z, ox, oy, oz, rd). An example of the log data is "2000/8/7 13:10:28 http://server.co.jp/test.wrl AKQ00100 Ken Satow 1. 2. 3. 4 10.0, 20.0, 30.0, 1.0, 0.0, 1.0, 0.5".

In the reception room 20, another avatar 28 may appear. The avatar 28 may be a receptionist avatar provided by the server 100 or may be an avatar selected and controlled by another user of the other client 130. The coordinates of the receptionist avatar 28 from the server 100 or of the user avatar 28 from the client 130 received by the server 100 are broadcasted by the server 100 to the client 120 and other remaining clients substantially in real time.

The user is also allowed to input a character message from the client 120 in a manner similar to the IRC or Talk to generate such a message on his or her own avatar 26 to allow the avatar 26 to talk with the other avatar 28. In this case, the server 100 also functions as an IRC server. The server 100 writes the message of the avatar 26 from the client 120 in the IRC file 119. The server 100 also broadcasts the messages of the avatars 26 and 28 to the other clients 130 and the like.

At Step 312, the server 100 writes the avatar coordinates in the log file 112 and writes the message in the IRC file 119. At Step 314 each time after Step 312 is performed, the server 100 determines whether the action monitoring period has ended.

If it is determined at Step 314 that the action monitoring period is ended, then, at Step 316 in FIG. 3B, the server 100 compares the avatar coordinates in the log file 112 with the coordinates or positions of the information displaying objects 22 in the reception room 20 and of the pieces of information associated with each object 22. Thereby, the server 100 determines the actions of the avatar 26, for example, whether the avatar 26 has approached a specific piece of information related to one of the commodities (a1, a2, . . . ), . . . , and (g1, g2, . . . ) associated with the respective shop names A to G in the reception room 20, and whether the detailed information of the specific piece of information is seen by clicking its URL. Thus the server 100 analyzes the action of the avatar 26 to derive an item of interest or concern or a feature of the user (e.g., a commodity category which the user is interested in), and writes the item of interest of the user as action data into the action recording file 122.

At Step 316, the server 100 also extracts a keyword related to the commodity from the message stored in the IRC file 119 that is provided by the user or the avatar 26, to determine an item of interest of the user, and writes the item of interest as action data into the action recording file 122.

A set of items of interest of the user is formed by one or more of the shop names A to G of the respective objects 22 and one or more of the commodity categories of the commodities (a1, a2, . . . ), . . . , and (g1, g2, . . . ) derived from the avatar's action as described above, and the basic user data inputted by the user. Some of the items of interest of the action data may additionally have respective weights or degrees of interest. For example, when the avatar 26 approaches a particular piece of information on a commodity of one of the objects 22 once, the weight for the category of that commodity is set to 1, and when the avatar 26 sees detailed information of the particular piece of commodity information once, the weight for the category of that commodity is set to 3. These weights are summed for each category of the commodity in the set of items of interest of the user.

The item of interest of the user and its weight may be derived also from the elapsed time from when the avatar 26 enters the reception room 20 until the avatar 26 enters a room inside a specific information displaying object 22, the walking distance during a fixed period of time, the number of approached information displaying objects 22, and the number of times that the avatar 26 has approached the same one of the information displaying objects 22. The item of interest and its weight may be derived also from the time during which the avatar 26 continuously sees a specific information displaying object 22 and description of a specific piece of information associated with the specific object 22. The item of interest and its weight may be derived also from the attitude (e.g. gaze and stare) in which the avatar 26 sees the specific object 22 and description of a specific piece of information associated with the specific object 22. If there are a large number of determined items of interest, only those with weights above a predetermined threshold weight (e.g., 3) may be selected to be applied.

In the virtual three-dimensional reception room 20 to be displayed on the video monitor 125, the characters and images associated with the information displaying objects 22 may be first displayed in an unreadable or imperceptible form, for example, in a small or blurred form, immediately after the avatar 26 enters the reception room 20. As the avatar 26 is approaching one of the objects 22, the characters and image of that object 22 are displayed in a more clearly readable and perceptible form, for example, a gradually larger and clearer form. When the user is interested in a specific one of the information displaying objects 22, he or she may control the avatar 26 to produce such an action that the avatar 26 gazes at it or sees the detailed information for at least a certain duration of time after that specific object 22 is displayed in a more readable and perceptible form. On the other hand, when the user is not interested in the specific object 22, the avatar 26 will be moved to other ones of the objects 22 in a short time or immediately after that object 22 is displayed in the more readable and perceptible form. Under these conditions, the coordinates representing the action of the avatar 26 are stored at fixed time intervals, and the stored coordinates is analyzed, to thereby facilitate to determine which one of the objects 22 and which piece of information of that object the user is interested in.

Then, at Step 318, the server 100 determines whether or not the past action data of the avatar 26 of the user is stored in the action recording file 122. If it stored, the items of interest of the past action data are read out. Then, at Step 320, the server 100 determines a presentation pattern of commodities in the variable virtual shop 30 formed on the top of the reception room 20, in accordance with the basic user data and the items of interest of the action data of the user at this time and in the past.

A virtual shop 30 in the determined presentation pattern has at least a combination of groups of commodities in the categories associated with the items of interest of the user. The commodities in the category with higher weights of interest are disposed near the entrance or at a noticeable place in the shop 30. The commodities in each category in the shop 30 is associated with one or more specific commodities of one or more of the objects 22 with shop manes A to G in the reception room 20. A sales clerk avatar 32 may be arranged in the virtual shop 30 to answer a question of the user avatar 26 and attend the avatar 26.

In order to generate the variable virtual shop 30, the server 100 may prepare a plurality of virtual world definition files (wrl) 116 for the virtual shop 30. The definition files 116 have respective presentation patterns, which are associated with respective predetermined reference sets of items of interest and the minimum weights for some of the items. The server 100 selects one of the definition files 116 associated with the respective reference sets of items of interest, in accordance with the determined items of interest and weights of the items for the user.

TABLE 1 schematically shows such reference sets of items of interest including reference basic user data and reference avatar's action data, and relations between the reference sets of items of interest and respective presentation patterns 1 to 7 and URLs associated with the respective patterns. The number (e.g., (2)) within the parentheses added to an item of interest (e.g., a1, b1) in the third column "Avatar's Action" in TABLE 1 shows the minimum weight of that item of interest for a corresponding presentation pattern.

TABLE 1

Reference Sets of Items of Interest, and Relations between Reference Sets of Items and Presentation Patterns and URLs

| Presentation Pattern # | Reference Set of Items of Interest | | |
|---|---|---|---|
| | Basic User Data | Avatar's Action | URL |
| 1 | Male, Age 30 or less, Personal Expenses $101–500, . . . | Shops A(3), B(1), Commodity Classes 1(2), b1(2), . . . | host.xx.jp/a.wrl |
| 2 | Male, Age 30 or less, Personal Expenses $501–1000, . . . | Shops A(1), B(3), Commodity Classes a2(2), b2(2), . . . | host.xx.jp/b.wrl |
| 3 | Male, Age 30 or less, Personal Expenses $1001–2000, . . . | Shops A(1), B(1), Commodity Classes a3(2), b3(2) . . . | host.xx.jp/c.wrl |
| 4 | Female, Age 30 or less, Personal Expenses $501–1000, . . . | Shops A(1), C(2), Commodity Classes a4(2), c1(2), . . . | host.xx.jp/d.wrl |
| 5 | Female, Age 30 or less, Personal Expenses $1001–2000, . . . | Shops A(2), C(1), Commodity Classes a5(3), c2(2), . . . | host.xx.jp/e.wrl |
| 6 | . . . | . . . | . . . |
| 7 | Others | Others | host.xx.jp/z.wrl |

The virtual world definition files have a number of respective different presentation patterns 1 to 7 of commodities in respective arrangements for the second virtual world 30 as shown in TABLE 1. For example, there may be a presentation pattern of a collection of only the specific famous brand commodities in a predetermined arrangement, a presentation pattern of a collection of the clothes in a predetermined arrangement, a presentation pattern of a collection of only the men's commodities in a predetermined arrangement, and a presentation pattern of a collection of the commodities only for young people in a predetermined arrangement.

The set of the items of interest of the subject user is compared with the reference sets of the items of interest in TABLE 1 associated with the respective presentation patterns 1 to 6 in TABLE 1, and one of the reference sets of items of interest that corresponds to the user's set of items of interest is selected. Thus one of the presentation patterns 1 to 6 that is associated with this selected reference set in the same row in TABLE 1 is selected for the virtual shop 30.

The user's set of the items of interest may correspond to two or more reference sets of the items in TABLE 1. For the purpose of addressing this indetermination, priorities are assigned to the presentation patterns 1 to 6, and only one of the corresponding presentation patterns 1 to 6 that has the highest priority is selected for the virtual shop 30. Alternatively, the user's items of interest having greater weights may be selected for comparison with the reference items of interest, and one of the corresponding presentation patterns 1 to 6 may be selected for the virtual shop 30.

If the user's set of items of interest does not correspond to any one of the specific reference sets of items of interest associated with the presentation patterns 1 to 6, then the remaining presentation pattern 7 for others in Table 1 is selected for the virtual shop 30.

Then, at Step 322, the server 100 determines whether or not the avatar 26 has passed through the door 25 to the virtual shop 30. If it is determined that the avatar 26 has not passed through the door 25 to the shop 30, then the server 100 at Step 336 determines whether the avatar 26 still stays in the reception room 20. As long as the avatar 26 continues to stay in the reception room 20, the Steps 312 to 322 are iteratively performed. If it is determined that the avatar 26 does not stay in the reception room 20, the procedure advances to Step 346 of FIG. 3C.

If it is determined at Step 322 that the avatar 26 has passed through the door 25 to the virtual shop 30, then, at Step 338 of FIG. 3C, the URL associated with the presentation pattern of the virtual shop 30 determined at Step 312 is determined in accordance with TABLE 1 and transmitted to the client 120. Upon receipt of the URL, the client 120 uses the Web browser to transmit, to the server 100, the URL to access the virtual shop 30 which is linked to the back of the door 25. At Step 340, the server receives the URL for accessing the virtual shop 30. At Step 342, the server 100 writes the URL data received from the client 120 as an access record into the action recording file 122. At Step 344, the server 100 transmits, to the client 120, a definition file 116 for the virtual shop 30 which is the second virtual world associated with the URL (e.g., a definition file associated with host.xx.jp/a.wrl in TABLE 1). The client 120 receives and processes the file and displays the image of the virtual shop 30 and the avatar 26 on the screen of the video monitor 125.

In the virtual shop 30, the user is allowed to control the avatar 26 to act and make a purchase in a similar form to the conventional virtual shop. At Step 346, it is determined whether an ultimate significant action, such as a purchase, has occurred. If the ultimate action has occurred, then, at Step 348, data of the action in the shop 30 is written into the action recording file 122.

Then at Step 350, it is determined whether the user has logged out. If it is determined that the user has logged out, the procedure is ended. If it is determined that the user has not logged out, the procedure returns to Step 322. The user, however, can control the avatar 26 to enter the reception room 20 again, without logging out, to allow the avatar 26 to produce an action in a different manner than before. Thus the procedure advances via the Steps 322 and 336 back to Step 312 in the flowchart of FIGS. 3A through 3C, to generate the virtual shop 30 having a different presentation pattern ahead of the door 25.

New processes involved in the flowchart of FIGS. 3A through 3C that occur between the server 100 and the client 120 in the embodiment of the invention will be described below with reference to FIGS. 8 through 11.

Figure 6:
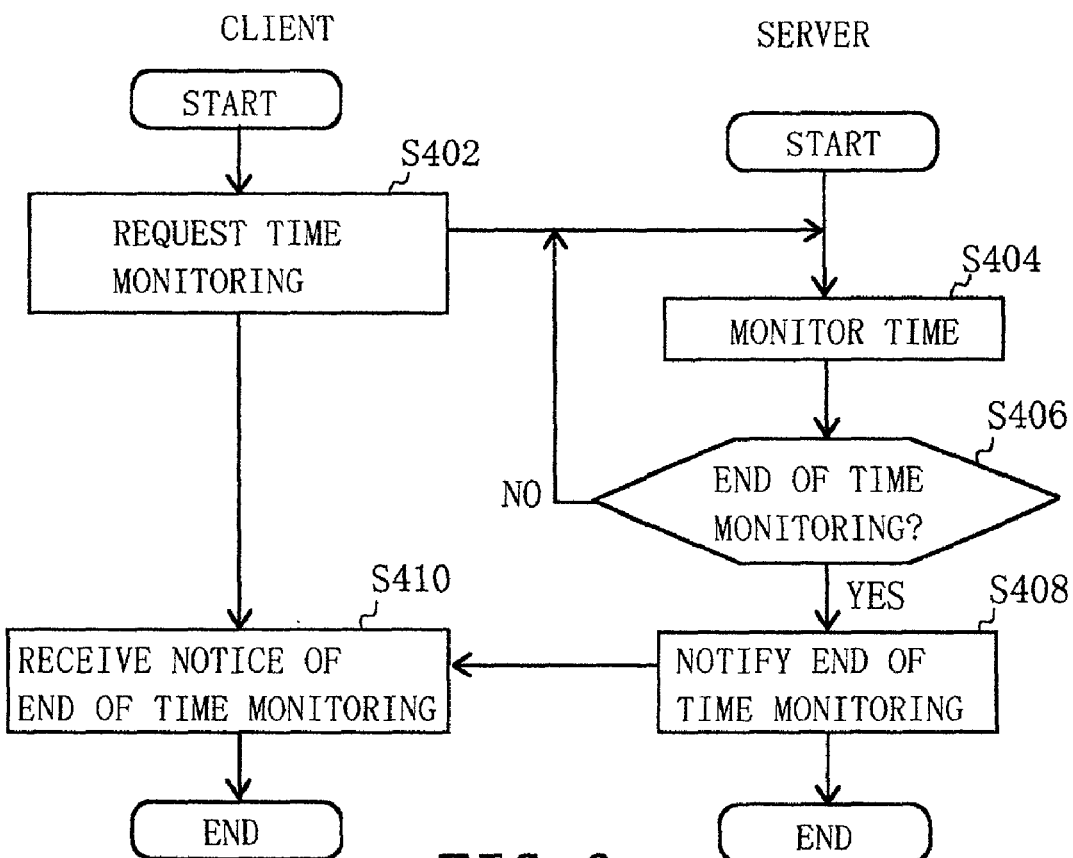
FIG. 6 is a flowchart for time monitoring that is performed between a server and a client of FIG. 1.

At Steps 312 and 314 of FIG. 3A, the server 100 monitors and watches the action of the avatar and the elapsed time. FIG. 6 shows a flowchart for the time monitoring involved in Steps 312 and 314 that is performed between the server 100 and the client 120. If it is determined that at Step 310 of FIG. 3A that the avatar 26 has entered the reception room 20, then, at the beginning of the Step 312 of FIG. 3A at Step 402 of FIG. 6, the client 120 transmits a request to the server 100 to monitor the elapsed time until a predetermined period of time has elapsed. Upon receipt of the request, the server 100, at Steps 404 and 406, monitors the elapsed time until the period has elapsed. If the server 100 at Step 406 determines that the predetermined period has elapsed, it ends the time monitoring at Step 408 and transmits a notice of the end of the time monitoring to the client 120. At Step 410, the client 120 receives the notice of the end of the time monitoring.

Figure 7:
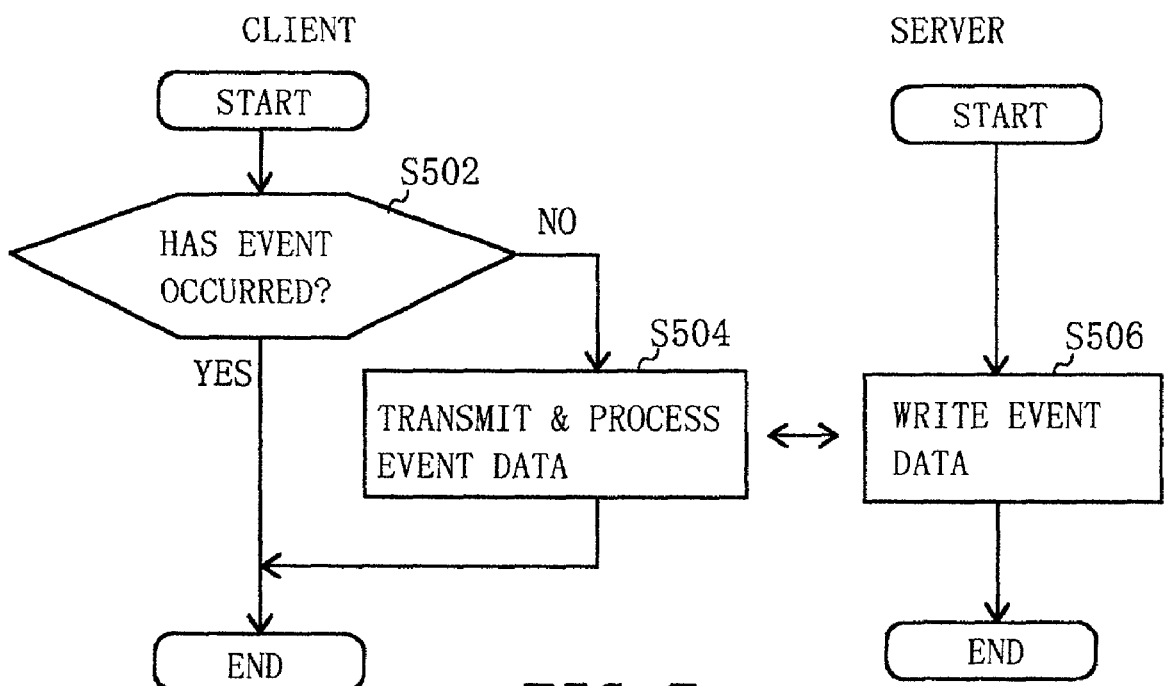
FIG. 7 is a flowchart for writing event data into a server file that is performed between a server and a client of FIG.

In this embodiment, the server 100 writes, into the event recording file 118, different events generated by the user, for example, an event that the avatar 26 has passed through the door 25 at Step 322 in FIG. 3B, and an event of a mouse click by the user. FIG. 7 shows a flowchart for the event writing involved in this embodiment that is performed between the server 100 and the client 120. At Step 502, the client 120 monitors user's operation of the input device. If the client 120 at Step 502 detects that an event has occurred, then, at Step 504, it transmits data of the event to the server 100 and processes the event in accordance with the processing definition. At Step 506, the server 100 receives the event data and writes it into the event recording file 118.

Figure 8:
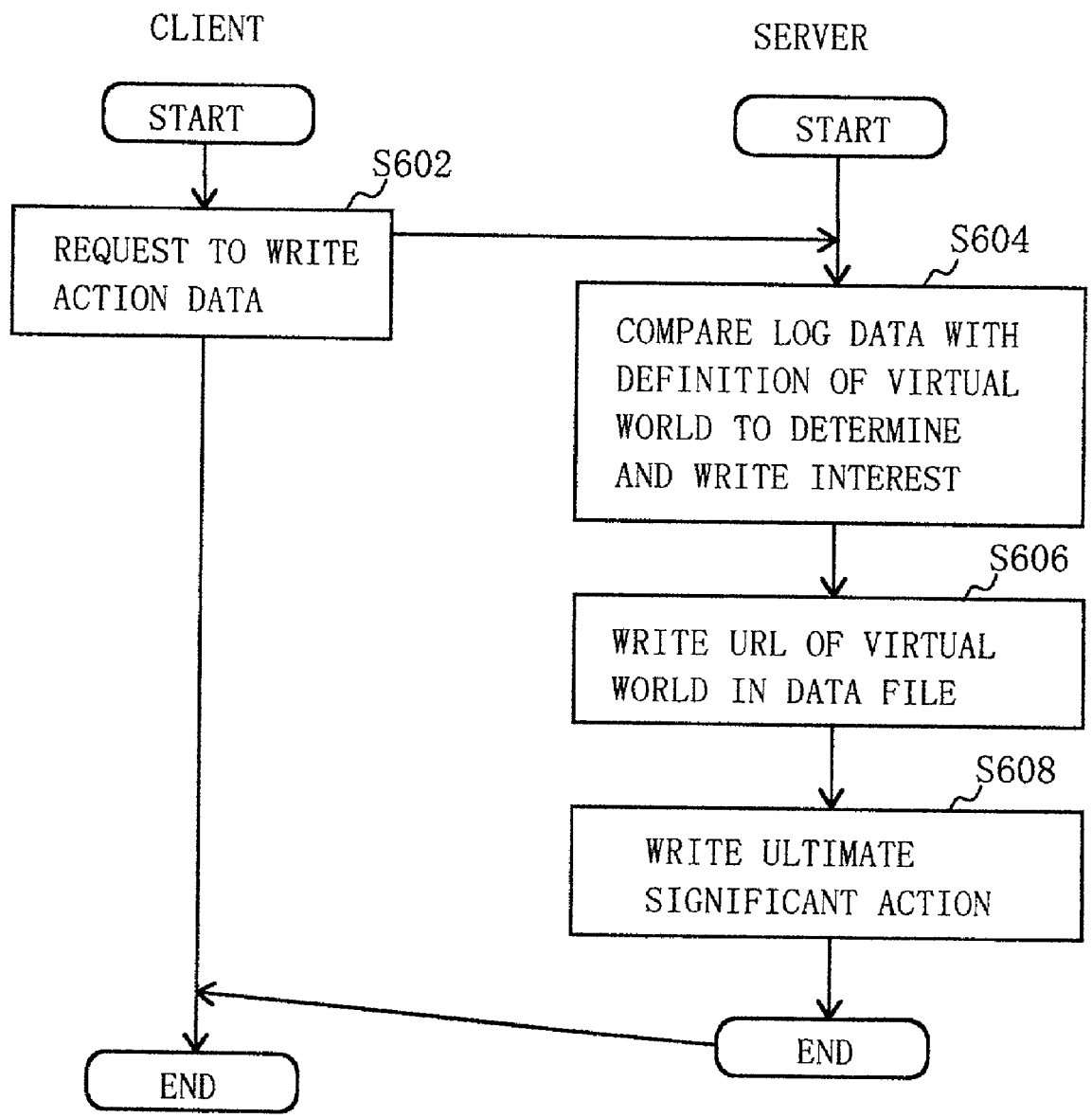
FIG. 8 is a flowchart for writing action data into a server file that is performed between a server and a client of FIG. 1.

At Step 316 in FIG. 3B, the server 100 writes the action data of the avatar 26 into the action recording file 122. FIG. 8 shows a flowchart for the action data writing involved in Step 316 that is performed between the server 100 and the client 120. At Step 602, the client 120 transmits a request to the server 100 to write the action data in the recording file 122. Upon receipt of the request, in Step 316 at Step 604 of FIG. 8, the server 100 compares the data in the log file 112 with the definition data of the virtual reception room 20 in the virtual world definition file 116 to determine an item of interest of the user, and writes it as the action data into the action recording file 122 as described above. Then, in Step 342 at Step 606 of FIG. 8, the server 100 writes the URL for accessing the determined virtual world 30 into the action recording file 122. In Step 348 at Step 608, the server 100 writes the ultimate significant action of the user such as a purchase into the action recording file 122.

Figure 9:
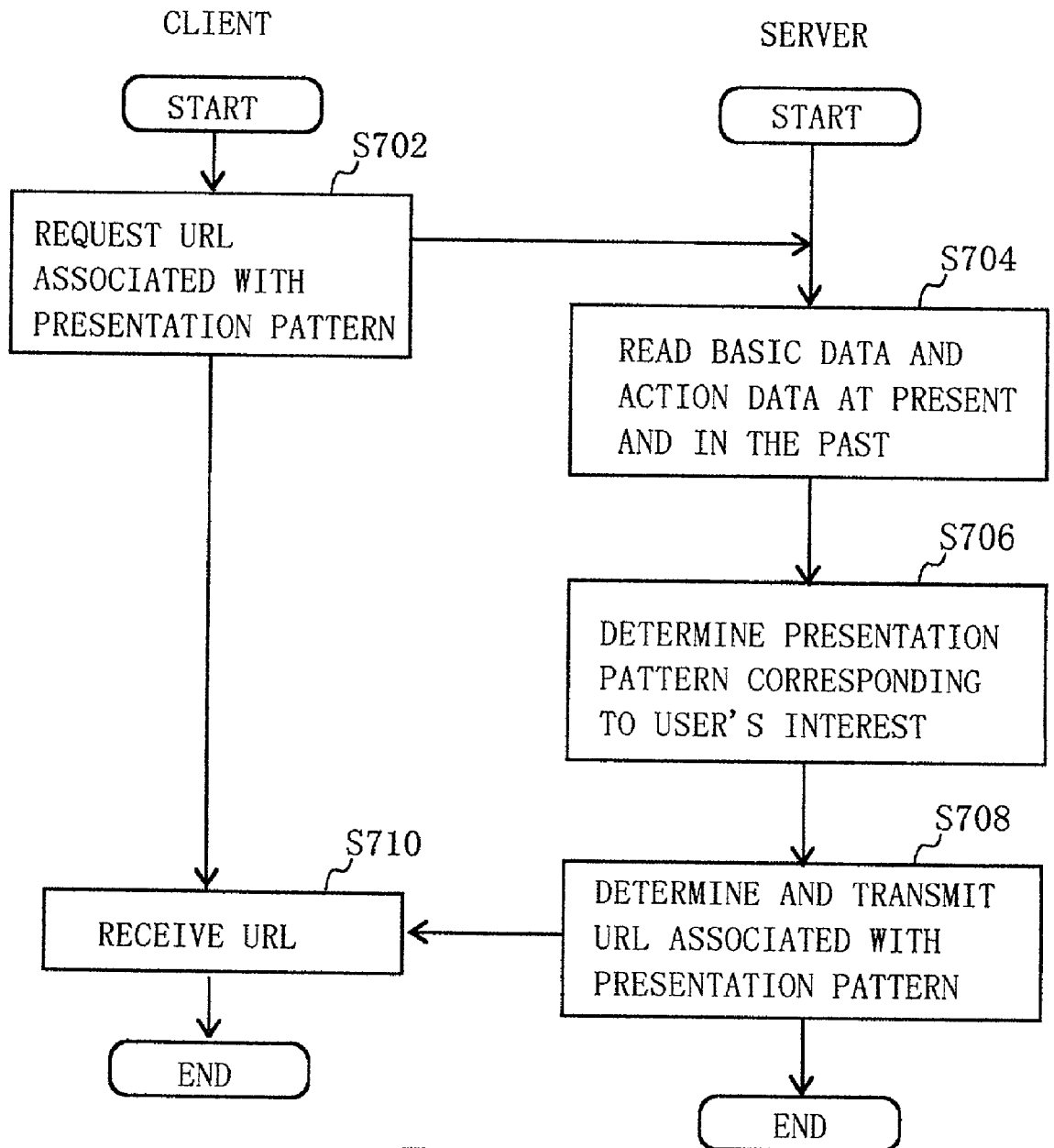
FIG. 9 is a flowchart for determining a presentation pattern that is performed between a server and a client of FIG. 1.

In this embodiment, the server 100 determines the presentation pattern at Step 320, and determines and transmits the URL associated with the pattern to the client 120 at Step 338. FIG. 9 shows a flowchart for the determining involved in Steps 320 and 338 that is performed between the server 100 and the client 120. At Step 702, the client 120 transmits a request for a URL associated with a presentation pattern for the second virtual world 30 to the server 100. Upon receipt of the request, at Step 704, the server 100 reads the basic user data and the action data at this time and in the past, and then, at Step 706, it determines a specific presentation pattern for the second virtual world 30 in accordance with the set of items of interest of the user. At Step 708, the server 100 determines a URL associated with the presentation pattern, and transmits it to the client 120. At Step 710, the client 120 receives the URL.

The present invention above has been described in connection with the embodiment of the virtual shop, but the invention is also applicable to other virtual worlds, such as a virtual university, as described above.

Figure 10:
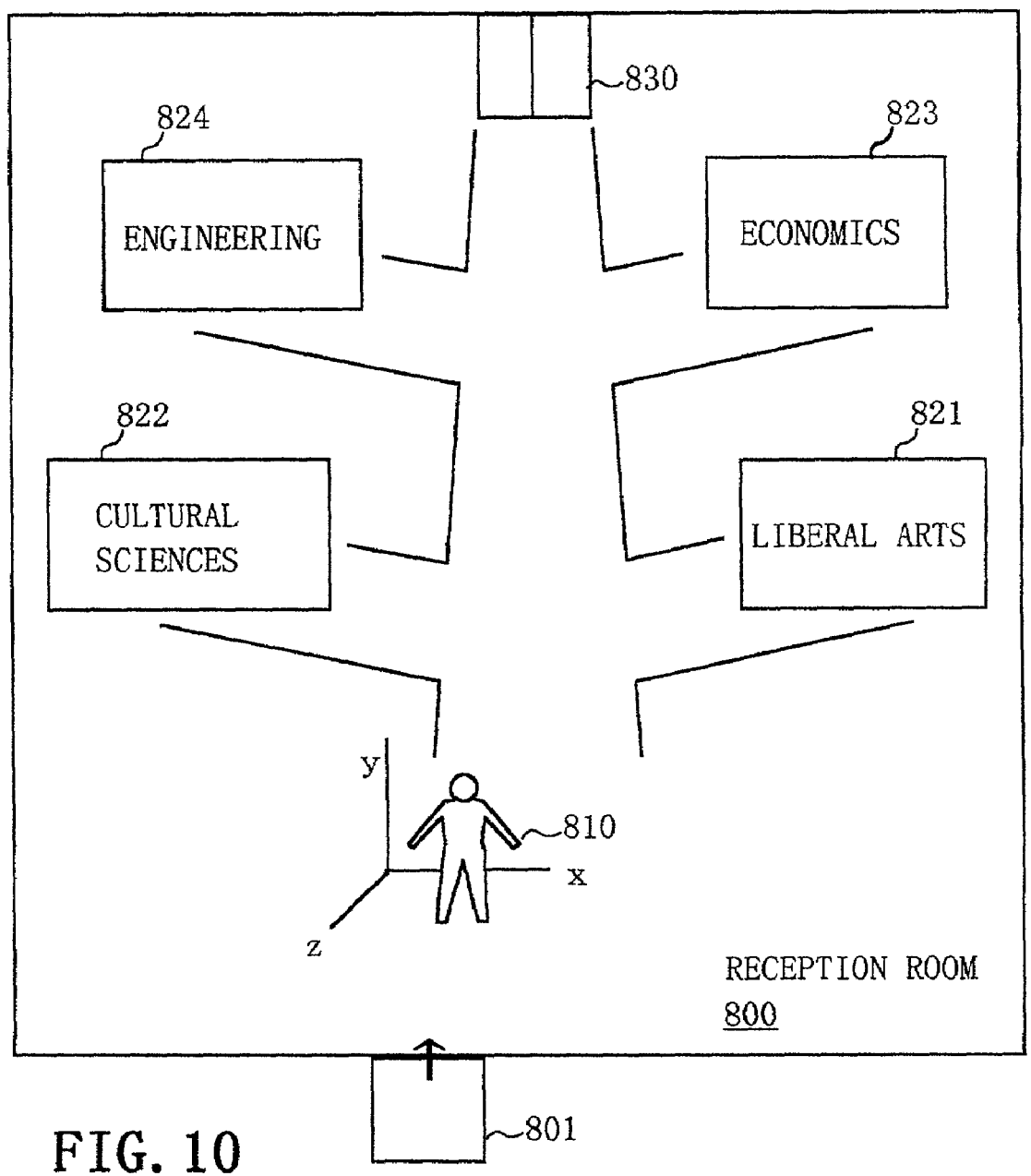
FIG. 10 shows a first predefined three-dimensional virtual world in accordance with another embodiment of the invention.

Another embodiment of the invention is described below in terms of the virtual university. FIG. 10 shows a reception room 800 as a first predefined virtual world for the virtual university. In the virtual university, the user is a student. An avatar 810 of the student in FIG. 10 is first selected in front of an entrance 801 in a similar manner as described above.

When the user logs in to a virtual university system, a questionnaire is provided to the user in the same manner as described above. The questionnaire includes questions about academic career, business career, and specialty, subjects studied in the past, field of interest, purpose of study, and the like.

In FIG. 10, information displaying objects 821 through 824 may have arranged information on liberal arts, cultural sciences and different fields of study.

The server 100 compares the avatar coordinates in the log file 112 with the coordinates of the information displaying objects 821 through 824 and of pieces of information of the objects in the reception room 800 in the same manner as above described. Thus the server 100 determines whether the avatar 810 has approached a specific piece of information in the reception room 800, and whether the avatar 810 has seen the detailed information of the specific piece of information. The server 100 then analyzes the action of the avatar 26 to derive an item of interest of the user (e.g., a special field of study, and subjects) and write the item of interest as action data into the action recording file 122.

In this case, the past action data in the action recording file 122 includes a history of registered subjects presented to the user in the past, used teaching materials, and the like. The set of items of interest includes the basic user data as described above.

In accordance with the set of items of interest of the user, the server 100 determines a specific presentation pattern of the arrangement of classrooms, installations, and professor and instructor avatars within the buildings of the virtual university to be linked to the top of the reception room 800 at the back of a door 830, in the same manner as described above. The classrooms, installations and professor avatars are associated with respective subjects and teaching materials.

Thus, in the virtual university system in accordance with the invention, the presentation pattern of the classrooms, professor avatars, subjects, teaching materials, their arrangement and the like can be variably generated in accordance with the set of items of interest of the user. Thus the user can make a study plan adapted to his or her own needs and proceed the study efficiently.

The above-described embodiments are only typical examples, and their modifications and variations are obvious to those skilled in the art. It should be understood that those skilled in the art can make various modifications to above-described embodiments without departing from the principle of the invention and from the scope of the invention defined by the accompanying claims.

What is claimed is:

1. An information processing apparatus comprising:
 a display;
 a memory device having a first memory area for storing avatar information as controlled by a user and a second memory area for storing data representative of a plurality of respective three-dimensional virtual reality scenes each with virtual objects therein; and
 a processor programmed to perform operations
  causing rendered images of a first three-dimensional virtual reality scene to be displayed from a third-person point of view on said display, data representative of said first virtual reality scene being stored in said second memory area, said first virtual reality scene including predefined virtual objects and an avatar controlled by said user, said virtual objects being associated with respective specific items of content, said avatar being controlled by said user to act in said first virtual reality scene and to gaze at objects therein to display in the images of the first virtual reality scene, where the display of an object displays information about a corresponding item of content;
  storing, at predetermined intervals in said first memory area, records of avatar coordinates representative of behavior of said avatar, as positions and gaze orientation information of said avatar as controlled, and a message of said avatar, in said first virtual reality scene by input from said user, the message of said avatar being inputted by said user while said avatar is talking with a different avatar in said first virtual reality scene;
  analyzing the action of said avatar in said first virtual reality scene in accordance with the records of the avatar coordinates stored in said first memory area relative to said virtual objects and coordinates of said virtual objects stored in said second memory area and extracting a keyword from the message inputted by said user to determine, as action data, weights of items of content that are of interest for respective categories to said user in relation to at least one of said virtual objects to which said avatar gets close according to the positions and the gaze orientation information of said avatar relative to positions of said predefined virtual objects and in relation to the extracted keyword, in said first virtual reality scene;
  providing, in accordance with said action data, a second three-dimensional virtual reality scene that includes other virtual objects, said other virtual objects having, in accordance with said action data, respective specific optimal items of content and having respective specific optimal positions for prominent display in said second virtual reality scene; and
  allowing rendered images of said second virtual reality scene to be displayed on said display.

2. The information processing apparatus according to claim 1, wherein a set of definition data of said second virtual reality scene is selected from sets of definition data of said respective virtual reality scenes.

3. The information processing apparatus according to claim 1, wherein a further weighted feature of said user is derived from data related to said user to determine said second virtual reality scene.

4. The information processing apparatus according to claim 1, wherein said second virtual reality scene includes said avatar.

5. The information processing apparatus according to claim 1, wherein definition data of said second virtual reality scene is accessed with a URL.

6. An information processing apparatus comprising:
a memory device having a first memory area for storing avatar information as controlled by a user and a second memory area for storing data representative of a plurality of respective three-dimensional virtual reality scenes from a third-person point of view, each with virtual objects therein; and
a processor programmed to perform operations
providing definition data of a first three-dimensional virtual reality scene stored in said second memory area to an information processing terminal of said user, said first virtual reality scene including predefined virtual objects and an avatar controlled by said user, said virtual objects being associated with respective specific items of content, said avatar being controlled to act in said first virtual reality scene by said user and to gaze at objects therein to display in the images of the first virtual reality scene, where the display of an object displays information about its corresponding item of content;
storing, at predetermined intervals in said first memory area, records of avatar coordinates representative of behavior of said avatar, as positions and gaze orientation information of said avatar as controlled, and a message of said avatar in said first virtual reality scene by input from said user, the message of said avatar being inputted by said user while said avatar is talking with a different avatar in said first virtual reality scene;
analyzing the action of said avatar in said first virtual reality scene in accordance with the records of the avatar coordinates stored in said first memory area relative to said virtual objects and coordinates of said virtual objects stored in said second memory area and extracting a keyword from the message inputted by said user to determine, as action data, weights of items of content that are of interest for respective categories to said user in relation to at least one of said virtual objects to which said avatar gets close according to tho at least the positions and the gaze orientation information of said avatar relative to positions of said predefined virtual objects and in relation to the extracted keyword, in said first virtual reality scene, and providing a second three-dimensional virtual reality scene including other virtual objects in accordance with weighted or identified items of content, said other objects having respective specific optimal items of content and respective specific optimal positions for prominent display in said second virtual reality scene, for said derived weighted interests; and
providing data associated with said second virtual reality scene to said user information processing terminal.

7. The information processing apparatus according to claim 6, wherein a set of definition data of said second virtual reality scene is selected from sets of definition data of said respective virtual reality scenes.

8. The information processing apparatus according to claim 6, wherein a further weighted interest of said user is derived from data related to said user to determine said second virtual reality scene.

9. The information processing apparatus according to claim 6, wherein said second virtual reality scene includes said avatar.

10. The information processing apparatus according to claim 6, wherein the data associated with said second virtual reality scene is a URL for definition data of said second virtual reality scene.

11. The information processing apparatus according to claim 6, wherein the data associated with said second virtual reality scene is definition data of said second virtual reality scene.

12. A program stored in a recording medium, said program being for use in an information processing apparatus, said information processing apparatus comprising a memory device and a processor, said memory device having a first memory area for storing avatar information as controlled by a user and a second memory area for storing data representative of a plurality of respective three-dimensional virtual reality scenes each with virtual objects therein, said program enabling said processor performing a process comprising:
causing rendered images of a first three-dimensional virtual reality scene to be displayed from a third-person point of view on a display, data representative of said first virtual reality scene being stored in said second memory area, said first virtual reality scene including predefined virtual objects and an avatar controlled by said user, said virtual objects being associated with a respective specific items of content, said avatar being controlled by said user to act in said first virtual reality scene and to gaze at objects therein to display in the images of the first virtual reality scene, where the display of an object displays information about a corresponding item of content;
storing, at predetermined intervals in said first memory area, records of avatar coordinates representative of behavior of said avatar, as positions and gaze orientation information of said avatar as controlled, and a message of said avatar, in said first virtual reality scene by input from said user, the message of said avatar being inputted by said user while said avatar is talking with a different avatar in said first virtual reality scene;
analyzing the action of said avatar in said first virtual reality scene in accordance with the records of the avatar coordinates stored in said first memory area relative to said virtual objects and coordinates of said virtual objects stored in said second memory and extracting a keyword from the message inputted by said user area to determine, as action data, weights of items of content that are of interest for respective categories to said user in relation to at least one of said virtual objects to which said avatar gets close according to the positions and the gaze orientation information of said avatar relative to positions of said predefined virtual objects and in relation to the extracted keyword, in said first virtual reality scene;
providing a second three-dimensional virtual reality scene including other virtual objects in accordance with said action data, said other virtual objects having respective specific optimal items of content and respective specific optimal positions for prominent display in said second virtual reality scene; and
allowing a rendered image of said second virtual reality scene to be displayed on said display.

13. The program according to claim 12, wherein a set of data representative of said second virtual reality scene is selected from sets of the data representative of said respective virtual reality scenes.

14. The program according to claim 12, wherein a further weighted feature of said user is derived from data related to said user to determine said second virtual reality scene.

15. The program according to claim 12, wherein said second virtual reality scene includes said avatar.

16. The program according to claim 12, wherein the definition data of said second virtual reality scene is accessed with a URL.

17. A program stored in a recording medium, said program being for use in an information processing apparatus, said information processing apparatus comprising a memory device and a processor, said memory device having a first memory area for storing avatar information as controlled by a user and a second memory area for storing data representative of a plurality of respective three-dimensional virtual reality scenes each with virtual objects therein, said program enabling said processor to perform a process comprising:

providing definition data of a first three-dimensional virtual reality scene stored in said second memory area to an information processing terminal of said user, said first virtual reality scene including predefined virtual objects and an avatar controlled by said user, said virtual objects being associated with respective specific items of content, said avatar being controlled by said user to act in said first virtual reality scene and to gaze at objects therein to display in the images of the first virtual reality scene from a third-person point of view, where the display of an object displays information about a corresponding item of content;

storing, at predetermined intervals in said first memory area, records of avatar coordinates representative of behavior of said avatar, as positions and gaze orientation information of said avatar as controlled, and a message of said avatar, in said first virtual reality scene by input from said user, the message of said avatar being inputted by said user while said avatar is talking with a different avatar in said first virtual reality scene;

analyzing the action of said avatar in said first virtual reality scene in accordance with the records of the avatar coordinates stored in said first memory area relative to said virtual objects and coordinates of said virtual objects stored in said second memory area and extracting a keyword from the message inputted by said user to determine, as action data, weights of items of content that are of interest for respective categories to said user in relation to at least one of said virtual objects to which said avatar gets close according to the positions and the gaze orientation information of said avatar relative to positions of said predefined virtual objects and in relation to the extracted keyword, in said first virtual reality scene, providing a second three-dimensional virtual reality scene including other virtual objects in accordance with the action data, said other virtual objects having respective specific optimal items of content and having respective specific optimal positions for prominent display in said second virtual reality scene; and providing data associated with said second virtual reality scene to said user information processing terminal.

18. The program according to claim 17, wherein a set of data representative of said second virtual reality scene is selected from sets of the data representative of said respective virtual reality scenes.

19. The program according to claim 17, wherein a further weighted interest of said user is derived from data related to said user to determine said second virtual reality scene.

20. The program according to claim 17, wherein said second virtual reality scene includes said avatar.

21. The program according to claim 17, wherein the data associated with said second virtual reality scene is the URL for definition data of said second virtual reality scene.

22. The program according to claim 17, wherein the data associated with said second virtual reality scene is definition data of said second virtual reality scene.

23. A method of generating a variable three-dimensional virtual scene, comprising:

storing data inputted by a user in a memory device, storing data representative of a plurality of respective three-dimensional virtual reality scenes, causing an image of a first three-dimensional virtual reality scene to be displayed from a third-person point of view on a display, data representative of said first virtual reality scene, said first virtual reality scene including predefined objects and an avatar controlled by said user, said objects being associated with a respective specific items of content, said avatar being controlled to act in said first virtual reality scene by said user, storing at predetermined intervals records of avatar coordinates representative of behavior of said avatar, as positions and gaze orientations of said avatar in said first virtual reality scene that are inputted by said user, the message of said avatar being inputted by said user while said avatar is talking with a different avatar in said first virtual reality scene, analyzing the action of said avatar in said first virtual reality scene in accordance with the records of the avatar coordinates stored in said first memory area relative to said virtual objects and coordinates of said virtual objects stored in said second memory area and extracting a keyword from the message inputted by said user to determine, as action data, weights of items of content that are of interest for respective categories to said user in relation to at least one of said virtual objects to which said avatar gets close according to the positions and gaze orientations of said avatar relative to positions of said predefined virtual objects and in relation to the extracted keyword in said first virtual reality scene;

providing a second three-dimensional virtual reality scene including other virtual objects having, in accordance with said action data, respective specific optimal items of content and having respective specific optimal positions for prominent display in said second virtual reality scene, and displaying said second virtual reality scene to said user.

24. The method according to claim 23, wherein said user inputted data is coordinate data and/or message data.

25. The method according to claim 23, wherein the data associated with said second virtual reality scene is the URL for definition data of said second virtual reality scene.

26. The method according to claim 23, wherein the data associated with said second virtual reality scene is definition data of said second virtual reality scene.

* * * * *

UNITED STATES PATENT AND TRADEMARK OFFICE
CERTIFICATE OF CORRECTION

| | | |
|---|---|---|
| PATENT NO. | : 7,155,680 B2 | Page 1 of 1 |
| APPLICATION NO. | : 09/840151 | |
| DATED | : December 26, 2006 | |
| INVENTOR(S) | : Yoshiko Akazawa et al. | |

It is certified that error appears in the above-identified patent and that said Letters Patent is hereby corrected as shown below:

Column 13, Line 48, after "to" delete "tho at least".

Signed and Sealed this

First Day of May, 2007

JON W. DUDAS
*Director of the United States Patent and Trademark Office*